United States Patent [19]

Clerc et al.

[11] 4,427,979

[45] Jan. 24, 1984

[54] PROCESS FOR THE CONTROL OF AN OPTICAL CHARACTERISTIC OF A MATERIAL BY SIGNALS OF INCREASING TIME PERIODS

[76] Inventors: Jean F. Clerc, 10, Allée du Pré Blanc, 38240 Meylan; Jacques Robert, Domain de la Ronce, Les Etanges A5 Rue de la Ronce, 92410 Ville d'Avray, both of France

[21] Appl. No.: 313,156

[22] Filed: Oct. 20, 1981

[30] Foreign Application Priority Data

Oct. 27, 1980 [FR] France .................. 80 22930

[51] Int. Cl.³ .................................. G09G 3/36
[52] U.S. Cl. .................. 340/805; 340/784; 340/793; 350/332; 358/241
[58] Field of Search .......... 340/793, 784, 765, 805, 340/752, 766, 783; 350/332, 330, 331, 333; 358/241

[56] References Cited

U.S. PATENT DOCUMENTS

| | | | |
|---|---|---|---|
| 4,006,298 | 2/1977 | Fowler | 340/793 |
| 4,180,813 | 12/1979 | Yoneda | 358/241 |
| 4,193,095 | 3/1980 | Mizushima | 340/793 |
| 4,319,239 | 3/1982 | Stephens | 358/241 |

*Primary Examiner*—Marshall M. Curtis
*Attorney, Agent, or Firm*—Pearne, Gordon, Sessions, McCoy, Granger & Tilberry

[57] ABSTRACT

Process for the control of an optical characteristic of a material intercalated between two electrodes to which are applied excitation signals, wherein in order to bring about an excitation of the material a series of elementary signals is applied to the electrodes for increasing periods of time, each elementary signal either being equal to a constant or zero, all these elementary signals constituting a decomposition of the desired excitation into a given base.

An application is in the field of optoelectronics and more particularly in the control of liquid crystal cells.

6 Claims, 4 Drawing Figures

PROCESS FOR THE CONTROL OF AN OPTICAL CHARACTERISTIC OF A MATERIAL BY SIGNALS OF INCREASING TIME PERIODS

BACKGROUND OF THE INVENTION

The present invention relates to a process for the control of an optical characteristic of a material. It is used in optoelectronics and mainly in the control of liquid crystal cells used more particularly as converters of electrical data into optical data, in the real time processing of optical images, in the formation of coloured filters which can be used in colour television and for analog display purposes.

Although it applies to materials of random shapes and sizes, the invention more particularly relates to the control of an imager comprising a display cell made from a material with a plurality of zones distributed in matrix-like manner and intercalated or interposed between a so-called cross-bar system. Such systems consist of a first group of p lines of parallel electrodes and a second group of q columns of parallel electrodes, the lines and columns being crossed. A zone $x_i y_j$ of the material is defined by the overlap region between line $x_i$ (in which i is an integer which can assume all values between 1 and p) and the column $y_j$ (in which j is an integer between 1 and q). The bars formed by the lines and columns of electrodes are such that they can carry appropriate signals for the excitation of the material.

Numerous devices of this type are known which, for example, use as the sensitive material a liquid crystal film and for which excitation is of an electrical nature. The invention more particularly applies to such devices, but it applies in a more general manner to any cross-bar device made from a material, whose optical characteristic can be modified by a random excitation. This excitation can be of an electrical nature, as for liquid crystals, but may also be magnetic, thermal, etc. The material can be a solid, liquid, amorphous or crystalline substance. The optical characteristic can be an opacity, a refractive index, a transparency, an absorption, a diffusion, a diffraction, a convergence, a rotatory power, a birefringence, an intensity reflected in a given solid angle, etc.

Besides liquid crystals materials which can be used are, for example, cadmium sulphide crystals which have an absorption band, whose front can be displaced by a thermal effect. In this case the controllable optical characteristic is the absorption of light and the excitation is a heating action. Reference can also be made to the case where the optical characteristic is the intensity of light reflected by a deformable diaphragm and in which the excitation is an electrostatic force.

A known control process comprises, for example, in the case of a liquid crystal cell where the excitation is of an electrical nature, the application to line $x_i$ of a sinusoidal voltage $V_x$ and to the other lines a zero voltage and the application to the columns $y_j$ of sinusoidal voltages $V_{yj}$ of the same duration and frequency as voltage $V_x$, but they are displaced by $\phi_{ji}$ with respect to voltage $V_x$. This phase displacement $\phi_{ji}$ makes it possible to vary the intensity of the signal to be displayed, i.e. makes it possible to obtain different grey levels.

Such a control process is described in French Patent No. 2 279 123, filed on Feb. 6, 1974 by the present Applicant entitled "Process for the control of an optical characteristic of a material and analog imager utilizing this process".

To obtain N grey levels with such a process, it is necessary to produce N different voltages $V_{yj}$. To apply one of the N voltages $V_{yj}$ to each of the q columns without producing them on each integrated circuit chip, it is necessary to use N transmission gates per column, i.e. q times N gates and to provide N connections per chip.

BRIEF SUMMARY OF THE INVENTION

The present invention relates to a control process making it possible to obviate these disadvantages and in particular making it possible to limit the number of transmission gates and the number of connections, no matter what the number of grey levels to be displayed. Thus, it is possible to limit the surface area occupied by the connections on the integrated circuit chip, despite an increase in the number of the grey levels.

In general terms the invention relates to a process for the control of an optical characteristic of a material intercalated between two electrodes to which are applied excitation signals, wherein in order to bring about an excitation of the material a series of elementary signals is applied to the electrodes for increasing periods of time, each elementary signal either being equal to a constant or zero, all these elementary signals constituting a decomposition of the desired excitation into a given base.

Preferably the said times increase as a power of two, all the elementary signals then constitute a decomposition into base two of the desired excitations. However, it is also possible to use any other time progression law corresponding to another decomposition of the excitation.

More specifically the present invention is a control process for a matrix imager comprising a display cell constituted by a material having a plurality of zones distributed in matrix-like manner and intercalated between a first group of p lines of parallel electrodes and a second group of two columns of parallel electrodes, the lines and columns being crossed, a zone $x_i y_j$ being defined by the region of the material covered by line $x_i$, in which i is an integer $1 \leq i \leq p$, and by column $y_j$, in which j is an integer such that $1 \leq j \leq q$, wherein for controlling the zone $x_i y_j$ of the material a first series of signals with a zero mean value is applied to a line $x_i$, said first series being divided into n fractions of different times, preferably such that the kth fraction of time is equal to $2^{k-1}\tau$, in which k is an integer such that $1 \leq k \leq n$ and $\tau$ a time interval useful in the excitation of the material, and a second series of signals of mean value zero is applied to the column $y_j$, said second series also being divided into n fractions of times such that the kth time fraction of the second series of signals is of the same duration as the kth time fraction of the first series of signals, the said second series of signals being such that during each time fraction the signal of the second series is either in phase opposition or in phase with the corresponding signal of the first series.

According to the invention, the temporal cutting up makes it possible to display N grey levels by using only two phase displacements between the lines and the column whereas, in the prior art, the displaying of N grey levels required in use of N phase displacements.

According to a preferred embodiment of the control process, each useful time fraction is followed by a dead time $\mu$ during which no signal is applied to the columns.

According to another preferred embodiment of the control process, the q zones of the same line $x_i$ are simultaneously controlled by simultaneously applying to each column the signal of the second series of signals corresponding thereto.

For reasons of clarity of reference is made to the control of an optical characteristic of a liquid crystal under the effect of an electric field applied. However, as stated hereinbefore the invention has much more general applications, but said liquid crystal devices are at present well known and widely used, so that the description is given with specific reference thereto.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
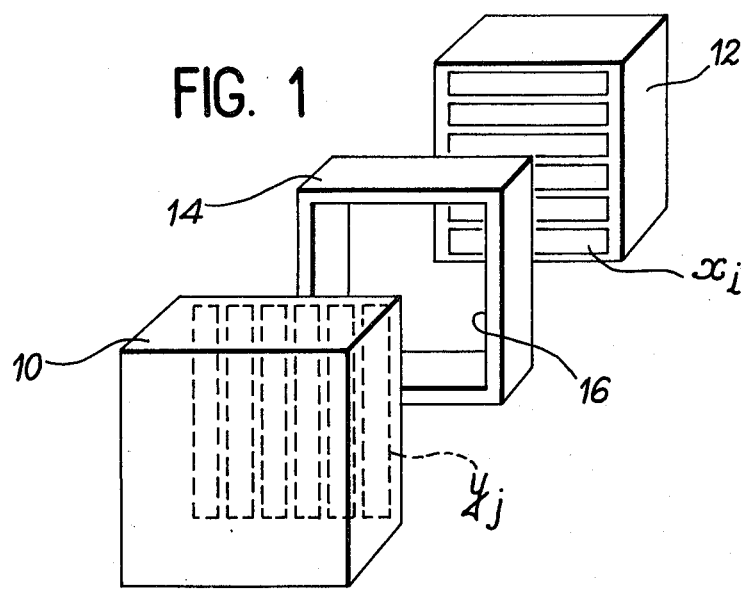
FIG. 1: an exploded perspective view of a liquid crystal cell using cross-bar electrodes.

FIG. 1 shows a cross-bar display cell comprising two, generally transparent walls 10 and 12 located on either side of an insulating material shim 14 defining a volume 16 occupied, when the cell is fitted, by a material of which an optical characteristic is controlled, e.g. a liquid crystal film. On walls 10 and 12 are deposited two systems of electrodes, constituted in each case by a series of semi-transparent, parallel conductive bars, designated $x_i$ for the lines and $y_j$ for the columns. The useful surface of the liquid crystal is in this way decomposed into a mosaic of zones corresponding to the overlap zones of two systems of electrodes, each zone corresponding to the overlap of two bars $x_i$ and $y_j$ and which can therefore be designated $x_iy_j$.

The sensitization of a zone, i.e. the control of an optical characteristic of the liquid crystal contained in this zone, takes place by applying electrical voltages to $x_i$ and $y_j$ leading to the appearance of an electric field within the liquid crystal. Thus, an image is made to appear over the entire cell, whilst defining it point by point and whilst sensitizing the zones in successive manner in accordance with the known principles of sequential control.

Figure 2:
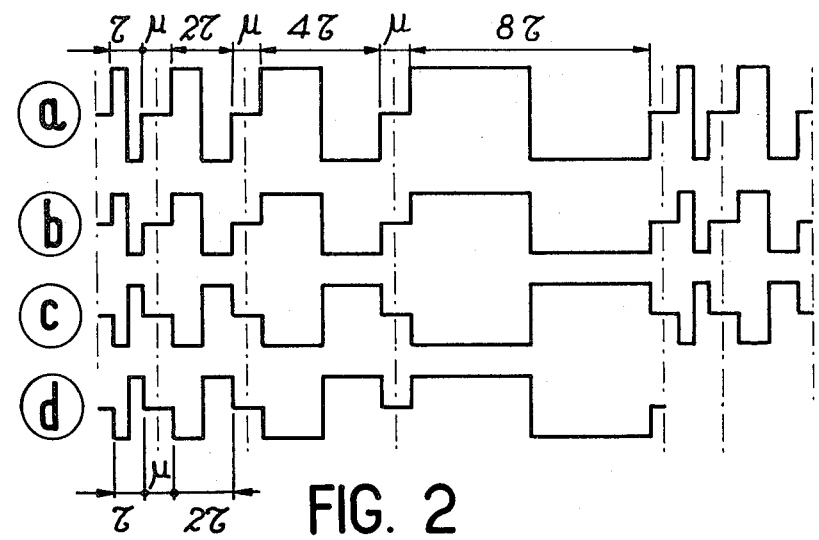
FIG. 2: the shape of the signals applied to the electrodes of a cross-bar cell.

FIG. 2 illustrates the control process according to the invention. FIG. 2 shows the shape of the signals applied to line $x_i$ and column $y_j$ for sensitizing zone $x_iy_j$ of the material.

In order to sensitize zone $x_iy_j$ to line $x_i$ is applied a first series of signals a divided into n different time fractions such that the kth time fraction is equal to $2^{k-1}\tau$, in which k is an integer such that $1 \leq k \leq n$ and $\tau$ is a time interval useful in the excitation of the material. To column $y_j$ is applied a second series of signals b or c, also divided into n time fractions such that the kth time fraction of the second series of signals is of the same duration as the kth time fraction of the corresponding first series of signals.

The unselected lines are raised to the same potential, which remains identical during the n time fractions of the addressing period of line $x_i$ (first series of signals a).

For each time fraction of the addressing period of line $x_i$, column $y_j$ receives during the corresponding time fraction either a signal b of the same phase as that applied to line $x_i$, or a signal c in phase opposition relative to that applied to said line. Each useful time fraction is followed by a dead time $\mu$ during which no signal is applied to the columns. During this dead time it is possible to carry out a commutation of signal b or c on to column $y_j$ in such a way that the kth time fraction of said signal is either in phase or in phase opposition with the corresponding signal a, as a function of the optical characteristic of the material which is to be displayed on the imager.

The display corresponding to zone $x_iy_j$ results from the accumulation of all the successive excitations applied during each time fraction to column $y_j$ throughout the addressing period of line $x_i$.

The reduction time of the optical effect produced by excitation on a line is sufficiently long for all the image to be displayed at the end of a scan of all the lines. To obtain the display of a complete line $x_i$ of the matrix imager, the q zones of said lines are simultaneously controlled by simultaneously applying the corresponding signal to each column.

In an imager using a liquid crystal cell, e.g. of the nematic type, the phenomenon used is the collective orientation of the molecules of said crystal parallel to the electrodes, when the crystal is subject to an electric field. The phenomenon used in such an imager is described in the aforementioned French Patent No. 2 279 123.

To prevent any interference in the liquid, due more particularly to the passage of ions, the excitation signal must have a zero mean value and a frequency exceeding the sweep frequency of the charges in the liquid. Thus, the signals applied to the electrodes have, for example, a square-wave configuration (FIG. 2).

To obtain one of the $2^n$ grey levels there is successive processing of the n time fractions of the second series of signals. Each grey level which is to be displayed on the imager is binary code. The bit of significance 1, designated $d_1$, is processed during the first time fraction, the bit of significance 2, designated $d_2$ during the second time fraction and so on up to the bit of significance $2^{n-1}$, designated $d_n$ during the nth time fraction.

The excitation of the material, particularly the liquid crystal film, is obtained when the signals applied to line $x_i$ and column $y_j$ for a given time fraction are in phase opposition, this state being represented by bit 1. Conversely, when the signals applied to the said line and said column during said time fraction are in phase, there is no excitation of the material and this state is represented by bit 0.

FIG. 2 shows signal d applied to a column and corresponding to grey level 7, binary coded 0111. The signal applied to the column and corresponding to bits $d_1$, $d_2$, $d_3$ is in phase opposition with the signal of the corresponding line used as the reference, whilst the signal applied to the column and corresponding to bit $d_4$ is in phase with the signal of said line.

Figure 3:
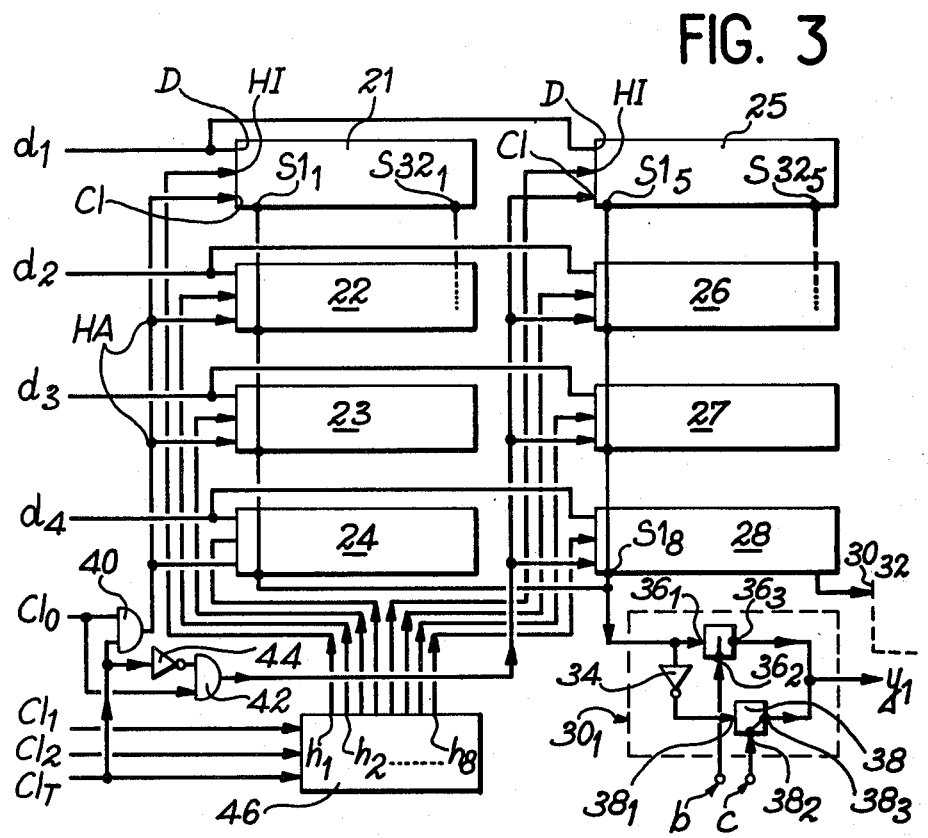
FIG. 3: diagrammatically part of the control circuits of a matrix imager according to the invention.

FIG. 3 diagrammatically shows part of the control circuits for a matrix imager according to the invention. In the embodiment shown the circuits make it possible to control 32 columns of electrodes of a matrix imager of the liquid crystal type with 16 grey levels. The sequential excitation means of the p lines, not shown in this drawing, can be constituted by an oscillator supplying the reference signal controlled by a clock defining the application sequences of said signals.

The control circuits of the 32 columns of the matrix imager are constituted by a first set of four shift registers 21, 22, 23, 24 and a second set of four shift registers 25, 26, 27, 28. The fact that two sets of registers are used makes it possible to "read" one of the sets of registers, whilst the other is "written", which makes it possible to increase the data processing rate and consequently the display rate on the matrix imager. Each of these eight registers has a series input d via which arrives the data corresponding to the four bits $d_1$, $d_2$, $d_3$, $d_4$, bit $d_1$ being connected to input d of registers 21 and 25, bit $d_2$ to input d of registers 22 and 26, etc., as well as a so-called clock input C1 and a high impedance control input HI.

The eight registers 21 to 28 also have 32 parallel outputs Sj, designated $Sj_1$ for register 21, $Sj_2$ for register 22 and so on, with j varying from 1 to 32, each connected a circuit 30/j (i.e. 30/1 ... 30/32). Each circuit 30/j has an inverter 34 and two analog signal transmission gates 36, 38.

Gates 36 and 38 respectively comprise a control input 36/1 and 38/1 which bring the gates into the "passing" position (gate 36) or into the "non-passing" position (gate 38), an analog signal input (b or c) 36/2 and 38/2 and a signal input 36/3 and 38/3, the output signal from either gate 36 or gate 38 is transmitted to the corresponding column $y_j$. Input 36/2 of gate 36 is connected to the output of inverter 34, which is itself connected to the input of circuit 30/j.

The matrix imager control circuit also comprises a first AND gate 40 with two inputs, one receiving a clock signal $Cl_0$ and the other a clock signal $Cl_T$ and an output supplying a signal HA applied to the input $C_1$ of the first set of registers 21, 22, 23, 24 and a second AND gate 42 with two inputs, one receiving a clock signal $Cl_0$ and the other a clock signal $Cl_T$, whose phase has been inverted by means of an inverter 44, and an output supplying a signal HB applied to the inputs Cl of the second set of registers 25, 26, 27, 28.

The control circuit also comprises a decoder 46 with three inputs, the first receiving the clock signal $Cl_T$, the second a clock signal $Cl_1$ and the third a clock signal $Cl_2$, whilst it also has eight outputs supplying eight signals $h_1$, $h_2$, $h_3$, $h_4$, $h_5$, $h_6$, $h_7$, $h_8$ respectively applied to registers 21, 22, 23, 24, 25, 26, 27 and 28 and controlling the high impedance input HI of said registers.

Figure 4:
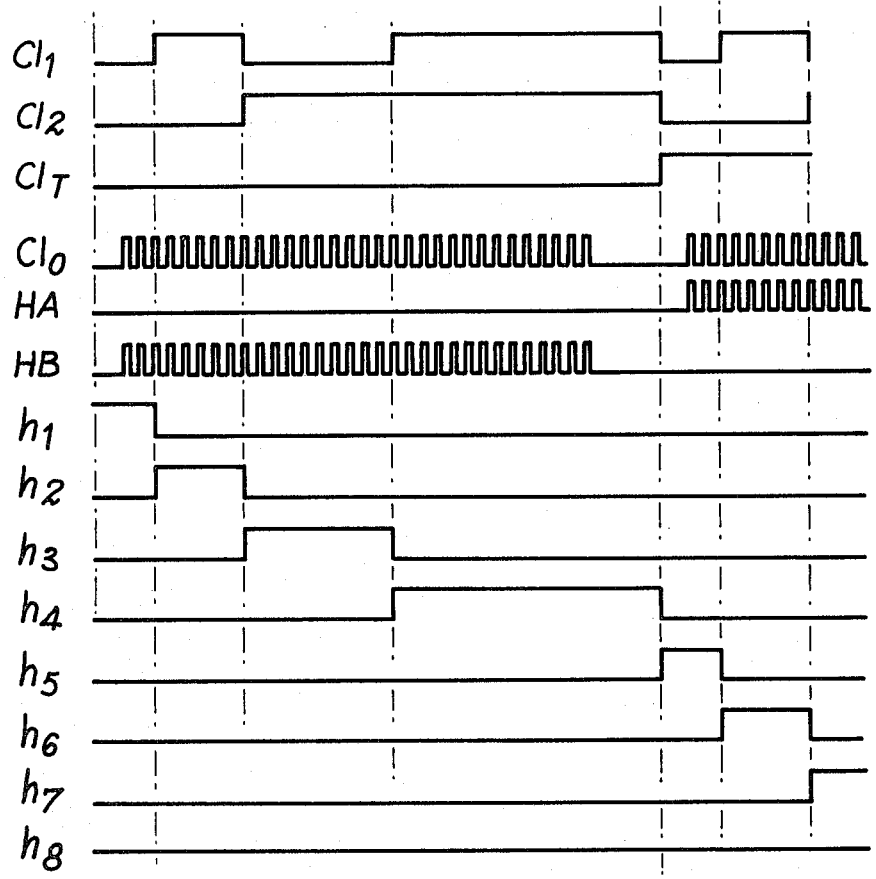
FIG. 4: diagrammatically the input and output signals applied to the circuits of FIG. 3.

The control circuit operation will now be described with reference to FIG. 4, which shows the different signals appearing at different points of the circuit.

Clock signals $Cl_1$, $Cl_2$ are transmitted to decoder 46. Clock signal $Cl_T$ is transmitted both to decoder 46, to gate 40 and to inverter 44. Clock signal $Cl_0$ is transmitted to gate 40 and to gate 42. Signals HA and HB coming respectively from gate 40 and gate 42 are respectively transmitted to the first and second sets of registers. Signals $h_1$, $h_2$, $h_3$, $h_4$, $h_5$, $h_6$, $h_7$, $h_8$ from decoder 46 are respectively transmitted to the high impedance input HI of registers 21, 22, 23, 24, 25, 26, 27 and 28.

According to the invention in order to obtain a given grey level on zone $x_i y_j$ of a matrix imager, a signal a constituted by four sequences of duration $2^{k-1}\tau + \mu$ for the kth sequence is applied to line $x_i$. The subdivision of said signal into four sequences is obtained by means of clock signals $Cl_1$ and $Cl_2$.

Each subdivision is ensured by the respective level of signals $Cl_1$ and $Cl_2$. The following table illustrates an example of the subdivision of the signal of line $x_i$ of the imager.

| Level of signal $Cl_1$ | Level of signal $Cl_2$ | Sequence | Sequence Duration |
|---|---|---|---|
| 0 | 0 | first | $\tau + \mu$ |
| 1 | 0 | second | $2\tau + \mu$ |
| 0 | 1 | third | $4\tau + \mu$ |
| 1 | 1 | fourth | $8\tau + \mu$ |

As has been shown hereinbefore each grey level is binary coded on four bits $d_1$, $d_2$, $d_3$, $d_4$. The input of data corresponding to the different grey levels to be applied to the 32 electrode columns of the imager takes place in parallel in the four registers of the same set, each shift register being constituted by 32 cells. Registers 21 and 25 contain data corresponding to the least significant bit $d_1$, whilst registers 24 and 28 contain data corresponding to the most significant bit $d_4$.

The sequential processing of the four bits $d_1$, $d_2$, $d_3$ and $d_4$ involves a sequential "reading" of each set of registers, as described hereinbefore. The selection of the register to be "read" is brought about by decoder 46, i.e. at any moment 7 of the 8 registers have their 32 outputs at high impedance and the eighth controls the 32 circuits 30/j. The selection of the register to be "read" is determined by clock signals $Cl_1$, $Cl_2$ and $Cl_T$ controlling decoder 46. Signal $Cl_T$ determines the set of registers to be "read", $Cl_1$ and $Cl_2$ the register from among the four of the set to be "read", (the first sequence of the above table corresponding to a selection of register 21 or 25). Signals $h_1$, $h_2$ ... $h_8$ from decoder 46 correspond to the control of one of the eight registers. The "reading" of one of the registers of the first set takes place when the level of signals $Cl_T$ is zero and the "reading" of one of the registers of the second set takes place when the level of signal $Cl_T$ is not zero.

When in the "reading" position the register ensures the control of the 32 circuits 30/j. One of the analog signals b or c arriving by the input 36/2 or 38/2 of gates 36 and 38 is transmitted to the column as a function of whether the gates 36 and 38 are in the "passing" or "non-passing" positions. For example, when gate 36 is in the "passing" position and gate 38 is in the "non-passing" position, signal b is transmitted. Conversely when gate 38 is in the "passing" position and gate 36 is in the "non-passing" position signal c is transmitted. The control of the gates in the "passing" or "non-passing" positions carried out by means of inverter 34 is dependent on the signal reaching the input of circuit 30/j. After reading in this way the four registers of the same set, the final signal received by column yj is, for example signal d (FIG. 2) corresponding to the display of the imager of the seventh grey level. The use of a shift register with 32 cells makes it possible to simultaneously display on the 32 columns of the imager the corresponding grey level (simultaneous display of one line of the imager).

Through the use of two sets of registers it is possible to "read" one of the sets, whilst the second set is "written", i.e. the latter records the 32 data of the same significance ($d_1$, $d_2$, $d_3$, $d_4$) corresponding to the 32 columns of the imager. The recording of the data is linked with the clock signals HA and HB respectively transmitted to the first and the second sets of registers.

Signal HA supplied to the first set of registers is constituted by the superimposing of two clock signals by means of the AND gate 40, 1 being the clock signal $Cl_0$ and the other the clock signal $Cl_T$. In the same way the clock signal HB supplied to the second set of register is constituted by superimposing two clock signals by means of the AND gate 42, one being clock signal $Cl_0$ and the other the clock signal $Cl_T$, whose phase has been inverted by means of inverter 44.

Each clock signal HA or HB controls the collective displacement in the 32 cells of the registers corresponding to said signals of the 32 data contained therein. Thus, the clock signal $Cl_0$ has throughout the addressing of the lines and columns of electrodes of the imager the same number of pulses as the registers have cells, i.e. outputs (e.g. 32 pulses).

When a set of registers is "read" it receives no clock signal HA or HB, whilst the second set, in the "write" position receives the clock signal corresponding thereto.

If the clock signal $Cl_T$ has a zero level the first set of registers is "read". Conversely if clock signal $Cl_T$ has a non-zero level the second set of registers is "read".

It should be noted that the period of the clock signal $Cl_T$ represents double the addressing time of an imager line, the zero level of signal $Cl_T$ corresponding to the addressing of e.g. the even lines of the imager and level one of said signal to the uneven lines.

Through the application of a dead time $\mu$ after each time fraction it is possible to switch the different signals to be applied to the imager columns and in particular permits the switching or non-switching of gates 36 and 38 and preventing any deformation of the column control signal resulting from the switching of the gates. This also prevents the existence of a direct current component.

What is claimed is:

1. A control process of an optical characteristic of a material for obtaining a display of a plurality of grey levels, said material having a plurality of zones distributed in a matrix-like manner and interposed between a first group of p lines of parallel electrodes and a second group of q columns of parallel electrodes, the lines and columns being crossed, a zone $x_i y_j$ being defined by the region of the material covered by line $x_i$, in which i is an integer such that $1 \leq i \leq p$, and by column $y_j$, in which j is an integer such that $1 \leq j \leq q$, wherein, for controlling the zone $x_i y_j$ of the material, the process includes:

applying a first series of signals with a zero mean value to a line $x_i$, said first series being divided into n different time fractions of different durations; and applying a second series of signals with a zero mean value to the column $y_j$, said second series also being divided into n different time fractions of different durations such that the kth time fraction of the second series of signals is of the same duration as the kth time fraction of the first series of signals, k being an integer such that $1 \leq k \leq n$, said second series of signals being such that for each time fraction, the signal of the second series is either in phase opposition or in phase with the corresponding signal of the first series.

2. A control process according to claim 2, wherein the n different time fractions are such that the kth time fraction is equal to $2^{k-1}\tau$, in which $\tau$ is a time interval useful in the excitation of the material.

3. A control process according to claim 2, wherein each useful time fraction is followed by a dead time $\mu$, during which no signal is applied to the columns.

4. A control process according to claim 2, wherein the q zones of the same line $x_i$ are simultaneously controlled by simultaneously applying the signal of the second series of signals corresponding thereto to each column.

5. A control process according to claim 1, wherein the signals are square-wave signals.

6. A control process according to claim 1, wherein the material is a liquid crystal film and the excitation signals applied to the electrodes are electrical voltages.

* * * * *